United States Patent [19]

Rameson

[11] 4,069,589

[45] Jan. 24, 1978

[54] WORK-MASTER COMPARISON GAGING METHOD AND INSTRUMENT

[75] Inventor: William W. Rameson, Santa Monica, Calif.

[73] Assignee: TRW Inc., Redondo Beach, Calif.

[21] Appl. No.: 684,609

[22] Filed: May 10, 1976

[51] Int. Cl.$^2$ .......................... G01B 5/20; G01B 7/28
[52] U.S. Cl. .................................................. 33/174 P
[58] Field of Search ............ 33/174 L, 174 P, 179.5 E

[56] References Cited

U.S. PATENT DOCUMENTS

| | | | |
|---|---|---|---|
| 2,372,427 | 3/1945 | Johnson | 33/174 P |
| 2,433,421 | 12/1947 | Bowness | 33/174 L |
| 2,752,690 | 7/1956 | Heath et al. | 33/174 P |
| 3,353,275 | 11/1967 | Porath | 33/174 P |
| 3,615,143 | 10/1971 | Barr et al. | 33/174 L |

FOREIGN PATENT DOCUMENTS

| | | | |
|---|---|---|---|
| 30,321 | 11/1969 | Japan | 33/174 P |

*Primary Examiner*—Richard E. Aegerter
*Assistant Examiner*—Richard R. Stearns

*Attorney, Agent, or Firm*—Donald R. Nyhagen; John J. Connors; Benjamin DeWitt

[57] ABSTRACT

A work part is compared to a master part, to measure the deviation, if any, between the parts, using a comparison gaging instrument having a master gaging probe with a fixed master engaging tip and a work gaging probe with an axially floating work engaging tip. The parts are compared by placing them side by side on a supporting surface, effecting relative movement of the parts and probes parallel to the supporting surface with the master and work probe tips in contact with the master and work parts, respectively, in a manner such that the relative movement of the probes with respect to the parts occurs in unison along the surfaces of the parts and the master probe and work probe tip are positioned axially by their respective surfaces, maintaining a fixed positional relationship between the master probe and work probe body in their axial direction during such relative movement, and producing an electrical signal proportional to the axial displacement of the work probe tip from a given datum position relative to the work probe body and representing the deviation of the work part from the master part at any given points of contact of the probes with the parts.

4 Claims, 2 Drawing Figures

WORK-MASTER COMPARISON GAGING METHOD AND INSTRUMENT

BACKGROUND OF THE INVENTION

1. Field of the Invention

This invention relates generally to the work gaging art and more particularly to a novel gaging method and instrument for comparing a work part and a master part.

2. Prior Art

A variety of work gaging applications involve comparing a work part to a master part to determine the accuracy with which the work part conforms to the master. Fabrication of a forming die, for example, often involves such a comparison gaging operation. A primary requirement of this kind of gaging operation is high gaging accuracy.

A variety of comparison gaging techniques and instruments for this purpose have been devised. These existing techniques and instruments, however, are often quite complicated, costly, and/or are otherwise not totally satisfactory.

SUMMARY OF THE INVENTION

This invention provides an improved comparison gaging method and instrument for comparing a work part to a master part and measuring the deviations, if any, between the parts. A primary application of the invention involves comparing a forming die to a die master to permit fabrication of a forming die which conforms, within desired tolerances, to the master.

According to the invention, a work part and master part are compared, using a comparison gaging instrument having a master gaging probe with a fixed master engaging tip and a work gaging probe with an axially floating work engaging tip. The master and work parts are placed side by side on a supporting surface and the parts and probes are moved relative to one another parallel to the supporting surface with the master and work probe tips in contact with the surfaces of the master and work parts, respectively, in a manner such that relative movement of the probes with respect to the parts occurs in unison along the surfaces of the parts, laterally of the probe axes, and the master probe and work probe tip are positioned axially by their respective surfaces. During this relative movement of the probes along the surfaces, the master probe and the body of the work probe are maintained in a fixed positional relationship in their axial direction. An electrical signal is produced which is proportional to the axial displacement of the work probe tip from a given datum position relative to the work probe body. This datum position is such that the signal represents the deviation, if any, of the work part from the master part at any given points of contact of the probe tips with the parts.

The comparison gaging instrument of the invention comprises a probe support and a table for supporting the master and work parts. The master gaging probe and work gaging probe body are mounted on the probe support, at positions spaced along the support, with the probe axis normal to the table and for axial movement of the master probe and work probe body relative to the support. Connecting the master probe and work probe body are means for effecting their axial movement in unison in a manner such as to maintain a fixed positional relationship between the body and master probe in their axial direction.

According to a feature of the invention, this connecting means comprises a counterweight arrangement which counterbalances the master probe and work probe body in such a way that vertical movement of the master probe in either direction causes precise corresponding vertical movement of the work probe body.

The work probe tip is mounted on the work probe body for axial floating movement relative to the body. Embodied in the work probe is a transducer for producing an electrical output signal proportional to the axial displacement of the probe tip from a given datum position relative to the body. This datum position is normally that at which the extremity of the master probe tip and the extremity of the work probe tip are disposed in a common plane normal to the probe axes.

In operation of the gaging instrument, the master part and work part are placed side by side on the work table in positions such that corresponding points on the surfaces of the parts are located on the probe axis. The probe support and work table are then moved relative to one another normal to the probe axes with the probe tips in contact with the parts in such a way as to effect relative movement of the probes over the surfaces. The master probe is maintained in contact with and is thereby positioned axially in accordance with the master surface. The work probe body follows the axial movement of the master probe while the work probe body remains in contact with the work surface, and the work probe transducer produces a signal representing the deviation or error, if any, of the work part.

DESCRIPTION OF THE PREFERRED EMBODIMENTS

Figure 1:
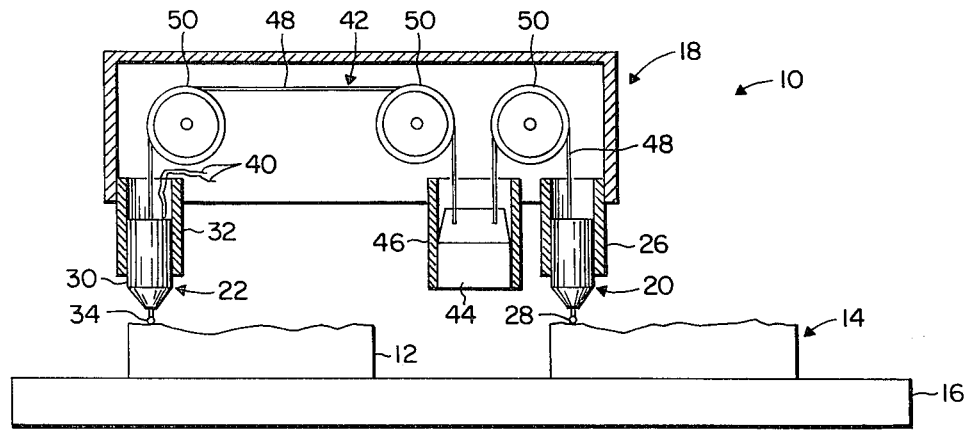
FIG. 1 is a section through a comparison gaging instrument according to the invention.
Figure 2:
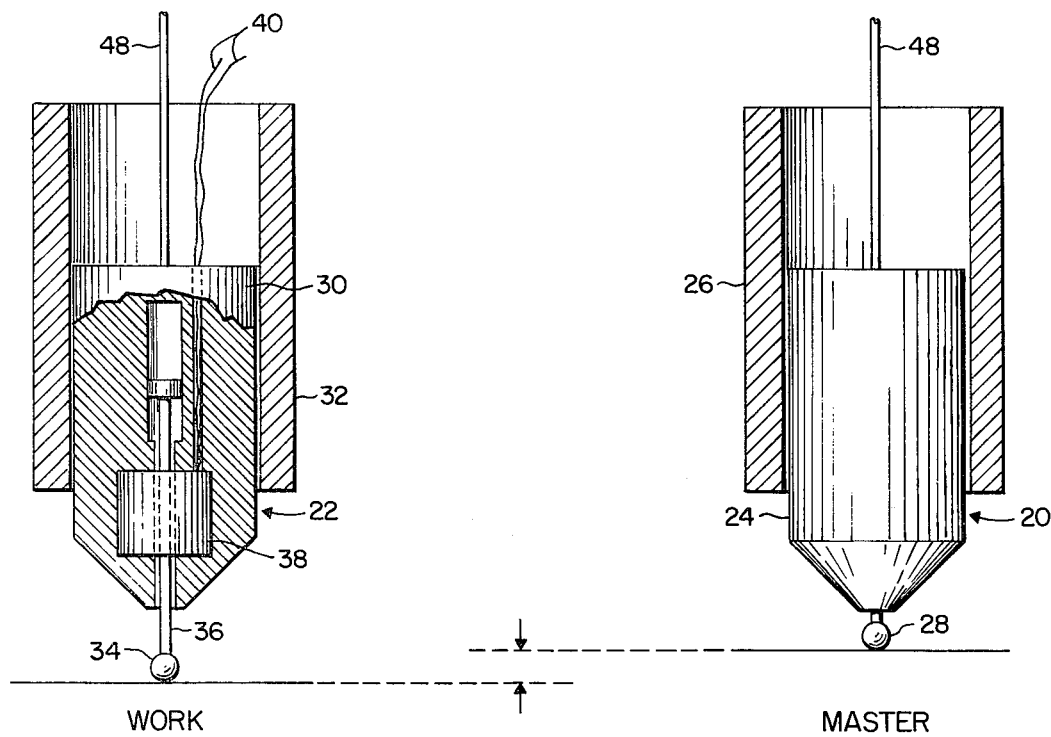
FIG. 2 is an enlarged section through the instrument gaging probes illustrating the comparison gaging operation of the instrument.

The drawings illustrate a comparison gaging instrument 10 according to the invention for comparing a work part 12 to a master part 14. The master part may be a forming die master and the work part may be a forming die intended to conform closely to the master.

The gaging instrument 10 has a work table 16 for supporting the master 14 and work 12 side by side, as shown, and a gaging probe support 18 opposite the table. The table and support are mounted by means not shown for relative movement in any direction parallel to the table surface and relative movement toward and away from one another transverse to the table surface. For simplicity of description, it will be assumed that the probe support is movable relative to the table. Thus, in the particular embodiment shown, the work table is stationary in a horizontal position and the probe support is located above the table and is movable horizontally in any direction relative to the table and vertically toward and away from the table.

Spaced along the probe support 18 are a master gaging probe 20 and a work gaging probe 22 having longitudinal axes normal to the table surface and, in this instance, vertically disposed. Master probe 20 has a body 24 mounted on the probe support 18 for free axial movement relative to the support by means of a close tolerance, precision slide 26. On the end of the probe body adjacent the table 14, i.e. the lower end, is a surface engaging tip 28 which is rigidly fixed to the body.

Work probe 22 has a body 30 mounted on the probe support 18 for free axial movement relative to the support by means of a second close tolerance, precision slide 32. At the end of the body 30 adjacent the work table 14, i.e. the lower end, is a surface engaging tip 34 having a stem 36 coaxial with and slidably supported within the probe body for free axial floating movement of the tip relative to the body. The work probe body contains a transducer 38 for producing a signal representing the axial displacement of the probe tip 34 from a given datum position relative to the body. This transducer has leads 40 for connection to external readout instrumentation.

The master probe body 24 and work probe body 30 are connected by means 42 for effecting axial movement of these bodies in unison so as to maintain a fixed positional relationship between them in their axially directions. The connecting means 42 shown constitutes an important feature of the invention and comprises a unique counterweight system for counterbalancing the probes in such a way that axial movement of the master probe 20 in either direction causes precise corresponding axial movement of the work probe body 30.

This counterweight system 42 includes a counterweight 44 between and having a weight equal to the combined weights of the master probe 20 and work probe 22 exclusive of the weight of the work probe tip 34. Counterweight 44 is mounted on the probe support 18 by means of a close tolerance precision slide 46 for movement along a vertical axis. Extending between and attached at their ends to this counterweight and the upper ends of the probe bodies 24, 30 are laterally flexible, relatively longitudinally rigid, i.e. non-stretchable, tension members 48 such as steel bands. These tension members extend over rollers 50 on the probe support 18 in a manner such that the counterweight 44 counterbalances the probes. The probe support is a hollow housing which encloses the rollers and tension members, and has bottom openings through which the members are attached to the probe bodies and counterweight.

From the description to this point, it will be understood that the counterweight system 42 is such that the probes 20, 22, i.e. probe bodies 24, 30, and the counterweight 44 move vertically in unison but in opposite directions. Normally, the probes will remain stationary in any position. On the other hand, if the master probe 24 is raised or lowered a given distance, the work probe body 30 will raise or lower the same distance. Thus, if the master probe is raised a distance, the upward force of the master probe on the counterweight will be removed and the weight will descend until the upward force of the master probe is again exerted on the weight to rebalance the system at thw new master probe position, thereby raising the work probe body the same distance as the master probe. If the master probe is lowered, the weight raises and thereby lowers the work probe body the same distance as the master probe.

In use of the gaging instrument 10, the work part 12 and master part 14 are placed on the work table 16 side by side in a manner such that corresponding points on their surfaces are located on the axis of the work probe 22 and master probe 20, respectively. The probe support 18 is then lowered until the master probe tip 28 just touches the surface of the master. At this point, the probe support is moved horizontally while the master probe is positioned axially or vertically by hand to maintain its tip in contact with the master surface in such a way as to scan the master surface with the master probe.

The work probe 22 moves horizontally in unison with the master probe 20, and the work probe body 30 moves axially or vertically in unison with the master probe as well as to maintain a fixed positional relationship between the master probe and work probe body. The work probe tip 34, on the other hand, is positioned axially or vertically solely by the work surface. The work probe transducer 38 produces a signal representing the axial displacement of this tip from a given datum position relative to the work probe body.

According to the present invention, this datum position is normally that at which the lower master and work engaging extremities of the probe tips 28, 34 are located in or tangent to a common plane normal to the probe axes, i.e. a horizontal plane. Thus, the transducer signal at any given corresponding points of contact of the tips with the master and work parts represents the deviation, if any, of the work part from the master part at such points. The transducer may be connected to any suitable readout instrumentation for displaying or recording the deviation.

I claim:

1. A gaging instrument for comparing the surfaces of a master part and a work part comprising:
    a support:
    a master gaging probe including a body defining a longitudinal axis and having a surface engaging tip on said longitudinal axis of the probe body;
    a work gaging probe including a body defining a longitudinal axis and having a surface engaging tip on said longitudinal axis of the probe body;
    means mounting said master probe and said work probe in laterally spaced relation on said support for independent axial movement relative to the support and to each other with said master probe and work probe axes substantially vertical;
    means operatively connecting said master probe and work probe for axial movement thereof in unison relative to said support in such a manner as to maintain a substantially fixed positional relationship between said master probe and work probe in their axial direction;
    said connecting means comprising a pair of relatively longitudinally rigid laterally flexible tension members, one of said members being connected at one end to said master probe and the other of said members being connected at one end to said work probe in a manner such that tension forces in said members produce upward forces on said master probe and work probe in opposition to the gravitational forces on said master probe and work probe, and counterbalance means rigidly connected to the other ends of said tension members and exerting on the latter ends endwise of the members a relatively constant counterbalance force approximating the combined gravitational forces on said master probe and work probe;
    the tip on one probe being stationary relative to its probe body and the tip of the other probe being mounted on its probe body for free axial floating movement relative to the body; and
    said other probe further including a transducer for producing a signal proportional to the axial displacement of its movable tip from a given datum position relative to its body.

2. A gaging instrument according to claim 1 wherein:

said counterbalance means comprises a counterweight whose weight approximates the combined weight of said master probe and work probe; and said connecting means further comprises means mounting said counterweight on said support for generally vertical movement relative to said support, and rollers over which said tension members extend between said probes and said counterweight.

3. A gaging instrument according to claim 2, wherein:

said support comprises a generally horizontally movable carriage supporting said probes for horizontal movement relative to said master and work parts.

4. A gaging instrument according to claim 2 wherein:

said support is stationary; and said instrument includes a table to support said master and work parts for generally horizontal movement relative to said probes.

* * * * *